US 8,148,958 B2

(12) United States Patent
Barrenscheen

(10) Patent No.: US 8,148,958 B2
(45) Date of Patent: Apr. 3, 2012

(54) SYSTEM AND METHOD FOR TRANSMITTING CURRENT SHARING INFORMATION AMONG PARALLELED POWER TRAINS

(75) Inventor: Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 531 days.

(21) Appl. No.: 12/340,285

(22) Filed: Dec. 19, 2008

(65) Prior Publication Data

US 2010/0156361 A1 Jun. 24, 2010

(51) Int. Cl.
G05F 1/00 (2006.01)
(52) U.S. Cl. ........................................................ 323/272
(58) Field of Classification Search .................. 323/272, 323/282, 283
See application file for complete search history.

(56) References Cited

U.S. PATENT DOCUMENTS

| | | | |
|---|---|---|---|
| 5,825,777 A * | 10/1998 | Komarek et al. ............. | 370/458 |
| 7,378,823 B2 * | 5/2008 | Yamanaka et al. ............ | 323/267 |
| 2009/0009005 A1 * | 1/2009 | Luo et al. ........................ | 307/82 |

OTHER PUBLICATIONS

Walters, M., *Current Sharing Technique for VRMs*, Technical Brief, TB385.1, Intersil, Jul. 2002, pp. 1-5.
*Microprocessor CORE Voltage Regulator Multi-Phase Buck PWM Controller*, Data Sheet, FN4765.6, Intersil, HIP6301, Dec. 27, 2004, pp. 1-17.

* cited by examiner

*Primary Examiner* — Adolf Berhane
*Assistant Examiner* — Yemane Mehari
(74) *Attorney, Agent, or Firm* — Slater & Matsil, L.L.P.

(57) ABSTRACT

An embodiment of the invention relates to a power control device configured to provide current-sharing control in a power converter including a plurality of power trains. The power control device transmits or receives a synchronization signal on a synchronization node to initiate a time frame that includes a plurality of time slots, and to control a switching activity of a power switch in a respective power train. The power control device further includes a current sharing bus node on which a digital current-sharing signal is transmitted in a designated time slot. The power control device determines a load current of the power converter and controls a power train current employing current data received on the current-sharing bus node from another power control device. The power control device may be a master power control device that transmits the synchronization signal on the synchronization node.

19 Claims, 6 Drawing Sheets

SYSTEM AND METHOD FOR TRANSMITTING CURRENT SHARING INFORMATION AMONG PARALLELED POWER TRAINS

TECHNICAL FIELD

An embodiment of the invention relates generally to electronic power conversion and methods, and more particularly to the use of a circuit node to communicate a control signal among switched-mode power converters.

BACKGROUND

A switched-mode power converter (also referred to as a "power converter" or "regulator") is a power supply or power processing circuit that converts an input voltage waveform into a specified output voltage waveform. DC-DC power converters convert a dc input voltage into a dc output voltage. Controllers associated with the power converters manage an operation thereof by controlling the conduction periods of switches employed therein. Generally, the controllers are coupled between an input and output of the power converter in a feedback loop configuration (also referred to as a "control loop").

Typically, the controller measures an output characteristic (e.g., an output voltage, an output current, or a combination of an output voltage and an output current) of the power converter, and based thereon, modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50%). Additionally, as voltage or current for systems, such as a microprocessor powered by the power converter, dynamically change (e.g., as a computational load on a load microprocessor changes), the controller should be configured to dynamically increase or decrease the duty cycle of the switches therein to maintain an output characteristic such as an output voltage at a desired value.

In an exemplary application, the power converters have the capability to convert an unregulated input voltage, such as 12 volts, supplied by an input voltage source to a lower, regulated, output voltage, such as 2.5 volts, to power a load. To provide the voltage conversion and regulation functions, the power converters include active power switches such as metal-oxide semiconductor field-effect transistors ("MOSFETs") that are coupled to the voltage source and periodically switch a reactive circuit element such as an inductor or the primary winding of a transformer to the voltage source at a switching frequency that may be on the order of 100 kHz or higher.

A conventional way to regulate an output characteristic of a switched-mode power converter, such as output voltage, is to sense a current in an inductive circuit element such as an output inductor in a forward converter topology or a transformer primary winding in a forward or flyback converter topology, and compare the sensed current with a threshold current level, generally using a comparator, to control a duty cycle of the power converter. The threshold current level is generally set by an error amplifier coupled to a circuit node such as an output terminal of the power converter to regulate the output characteristic. Such a process is generally referred to as current mode control. Alternatively, the output of the error amplifier can be compared to a fixed sawtooth waveform to regulate the output characteristic. Such a process is generally referred to as voltage mode control. The mechanism to control duty cycle is a signal produced by the comparison process to turn a power switch "on" or "off."

In dc-dc power converter applications, including point-of-load applications (commonly referred to as "PoL" applications), there is often the need to drive several power trains with paralleled outputs. A power train refers to a power-processing portion of a power converter and generally includes an active power switch, such as a MOSFET, and a reactive circuit element, such as an inductor or a transformer. Such a multiphase circuit structure helps to increase the output power. A multiphase circuit structure may also be employed to reduce EMI, to improve cooling, and to reduce the input ripple current compared to a larger single power converter.

In a power converter application wherein several power trains are coupled together with paralleled outputs, each power train has to "know" how many power trains are connected together to determine if its individual load current is low or high compared to the individual load currents provided by the other paralleled power trains. It is difficult in such an analog circuit arrangement to consistently handle information describing the number of power trains actively operating in parallel, especially if the number of active power trains can vary between a full load and a low load operating condition, which is often the case when a power converter formed with a plurality of power trains is constructed to optimize its net efficiency by selectively disabling individual power trains in response to sensing the total load current. Moreover, the accuracy with which current is shared among the active, paralleled power trains depends on the accuracy of the sensing arrangement and the data exchange mechanism that are employed to signal the total power converter load current to the individual power trains.

Another difficulty in such current sharing arrangements is the reaction of the different power trains after detection of an asymmetry in output currents from the individual power trains. From a control point of view, it is often important that adaptation of power train parameters due to a change in current sharing or a change in total load current does not interfere with load regulation, such as control of the output voltage of the power converter. An example of a change in current sharing is disabling or re-enabling of a power train after a reduction or an increase in load current. If the power trains update their parameters at different points in time, intermediate changes in power train current sharing can occur that can lead to an undesired control response, even to an instability or to a limit cycle.

Thus, there is a need for a process and related method to provide a measure of total load current information to individual power trains in a switched-mode power converter, as well as the number of power trains that are active in the power converter to enable dynamic control of current sharing by the individual power trains. This control information would advantageously be provided with a minimal number of pins that avoids the disadvantages of conventional approaches.

SUMMARY OF THE INVENTION

In accordance with an exemplary embodiment and a related method, a power control device is configured to provide current-sharing control in a power converter including a plurality of power trains. In an embodiment, the power control device transmits or receives a synchronization signal on a synchronization node that is employed to initiate a time frame. The time frame includes a plurality of time slots. The synchronization signal is also employed to control a switching activity of a power switch in a power train such as a phase delay. The power control device further includes a current sharing bus node. The power control device transmits a digital signal on the current sharing bus node that may be a current-sharing signal in a designated time slot in the plurality of time slots. In an embodiment, the power converter includes the power control device and another power control device. The power control device determines a load current of the power converter employing current data received on the current-sharing bus node from the another power control device. In an embodiment, the power control device controls a current of the power control device dependent on the value of the load current.

Thus, a synchronization signal synchronizes the switching activity of a plurality of power trains in a power converter to support input current sharing. The synchronization signal determines the timing of a data exchange mechanism. Based on this timing, a time frame is initiated.

In an embodiment, the power control device is a master power control device that transmits the synchronization signal on the synchronization node. In an embodiment, the master power control device transmits the value of the load current in a further designated time slot.

In an embodiment, the plurality of time slots includes a frame. The frame includes a header, and the power control device employs the header to synchronize an action in the power control device with a related action in another power control device. In an embodiment, the action includes determination of the value of the load current. In an embodiment, the header is employed to signal transmission of a different digital signal in the designated time slot such as a local temperature signal.

In an embodiment, the power control device is coupled to a further node. The further node is configured to provide a signal to the power control device to identify the designated time slot in the plurality of time slots and to control the switching activity of the power switch. For example, the further node may be grounded with a shorting strap to provide the identifying signal.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a structure including a digital current sharing bus for a power converter including a plurality of power trains, wherein the current sharing bus is synchronized for the plurality of power trains with a master clock signal.

For a dynamically changing current distribution between different power train devices or for setup of a system before operation, a master power control device is conventionally used. The master power control device is connected to the power train devices via a bus structure that can be either a broadcast structure (such as a PM bus), or a star topology, or other peer-to-peer communication bus arrangement.

The master power control device collects (requests) required information from the power train devices and distributes the outcome of the calculation process to the power trains. The activity of the master power control device is currently not synchronized to any switching activity of the power train devices because the bus connections have their own timing. Therefore, in each power control device there is the need to provide a mechanism to establish the necessary synchronization to the communication bus structure and to the switching action of the power train. This is a centralized approach, wherein the power train devices rely on a master power control device for their operation.

An embodiment of the invention may be applied to various power conversion arrangements that include other data-transfer structures, for example, broadcast bus systems such as PMBus ("Power Management Bus," a two-wire communication protocol), a star topology, or other peer-to-peer topologies. Power conversion arrangements can be constructed and applied using processes as introduced herein in different contexts using inventive concepts described herein, for example, a power conversion arrangement used to control the speed of a motor or for a power amplifier.

Figure 1:
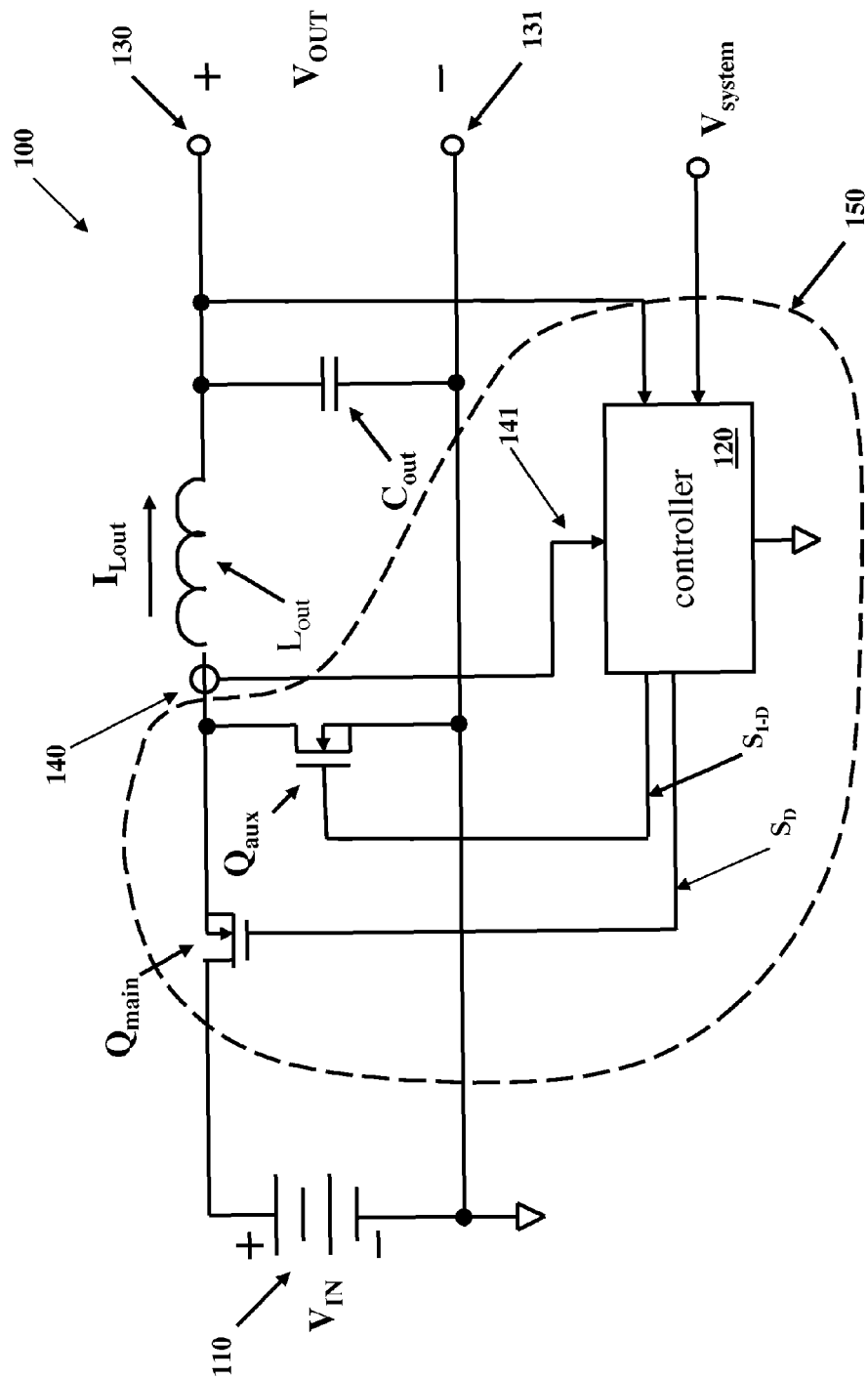
FIG. 1 illustrates a simplified schematic diagram of an embodiment of a power train of a switched-mode power converter including a controller to illustrate the operation thereof, and to provide an environment for application of the principles introduced herein.

Referring initially to FIG. 1, illustrated is a simplified schematic diagram of an embodiment of a power train 100 of a switched-mode power converter including a controller 120 to illustrate the operation thereof, and to provide an environment for application of the principles introduced herein. The power converter provides power to a system/load (not shown) coupled to output terminals 130 and 131. The controller 120 regulates a power converter output characteristic such as an output voltage. While in the illustrated embodiment the power train employs a buck converter topology, those skilled in the art should understand that other converter topologies such as a flyback topology or an isolated forward topology are well within the broad scope of the present invention.

The power train of the power converter receives an input voltage $V_{IN}$ from a source of electrical power (represented by battery 110) at an input thereof and provides a regulated output voltage $V_{OUT}$ or other output characteristic at output terminals 130 and 131. In keeping with the principles of a buck converter topology, the output voltage $V_{OUT}$ is generally less than the input voltage $V_{IN}$ such that a switching operation of the power converter can regulate the output voltage $V_{OUT}$.

During a first portion D of a high-frequency switching cycle, the power switch $Q_{main}$ is enabled to conduct in response to a gate drive signal $S_D$ for a primary interval, coupling the input voltage $V_{IN}$ to an output filter inductor $L_{out}$. During the first portion D of the switching cycle, an inductor current $I_{Lout}$ flowing through the output filter inductor $L_{out}$ increases as current flows from the input to the output of the power train. An ac component of the inductor current $I_{Lout}$ is filtered by the output capacitor $C_{out}$.

During a second portion 1-D of the switching cycle, the power switch $Q_{main}$ is transitioned to a non-conducting state, and an auxiliary power switch $Q_{max}$ (e.g., an n-channel MOSFET), coupled to the output filter inductor $L_{out}$, is enabled to conduct in response to a gate drive signal $S_{1-D}$. The auxiliary power switch $Q_{aux}$ provides a path to maintain continuity of inductor current $I_{Lout}$ flowing through the output filter inductor $L_{out}$. During the second portion 1-D of the switching cycle, the inductor current $I_{Lout}$ flowing through the output filter inductor $L_{out}$ decreases. In general, the duty cycle of the power switch $Q_{main}$ and the auxiliary power switch $Q_{aux}$ may be adjusted to regulate the output voltage $V_{OUT}$ of the power converter. Those skilled in the art should understand, however, that the conduction periods for the two power switches may be separated by a small time interval to avoid cross conduction therebetween, and beneficially to reduce the switching losses associated with the power converter.

The controller 120 of the power converter receives the output voltage $V_{OUT}$ of the power converter and a desired output characteristic such as a desired system voltage $V_{system}$. In addition, the controller 120 receives a signal 141 from a current sensing device 140 that senses a current in the inductor $L_{out}$. The current sensing device 140 can be constructed with a current sensing transformer or with a sense resistor and an operational amplifier. The controller 120 controls conductivity of the power switch $Q_{main}$ with the duty cycle D.

In a switched-mode power converter, such as the buck power converter illustrated and described with reference to FIG. 1, the duty cycle D of the power switch $Q_{main}$ determines the steady-state ratio of a power converter output voltage $V_{OUT}$ to its input voltage $V_{IN}$. In particular, for a buck power converter typology operating in a continuous conduction mode, the duty cycle D determines the ratio of output voltage to input voltage (ignoring certain losses within the power converter) according to equation (1):

$$D=V_{OUT}/V_{IN}. \tag{1}$$

In an alternative power converter typology, such as a boost topology, the duty cycle may determine the ratio of output voltage to input voltage according to another equation.

Portions of the circuit illustrated in FIG. 1 may be formed as a circuit subassembly. For example, the controller 120, the power switch $Q_{main}$, and the auxiliary power switch $Q_{aux}$ may be formed as a circuit subassembly 150, referred to herein as a master power control device or a slave power control device.

Of course, the power switches may be formed in a separate circuit subassembly from the other elements in the power control device.

Figure 2:
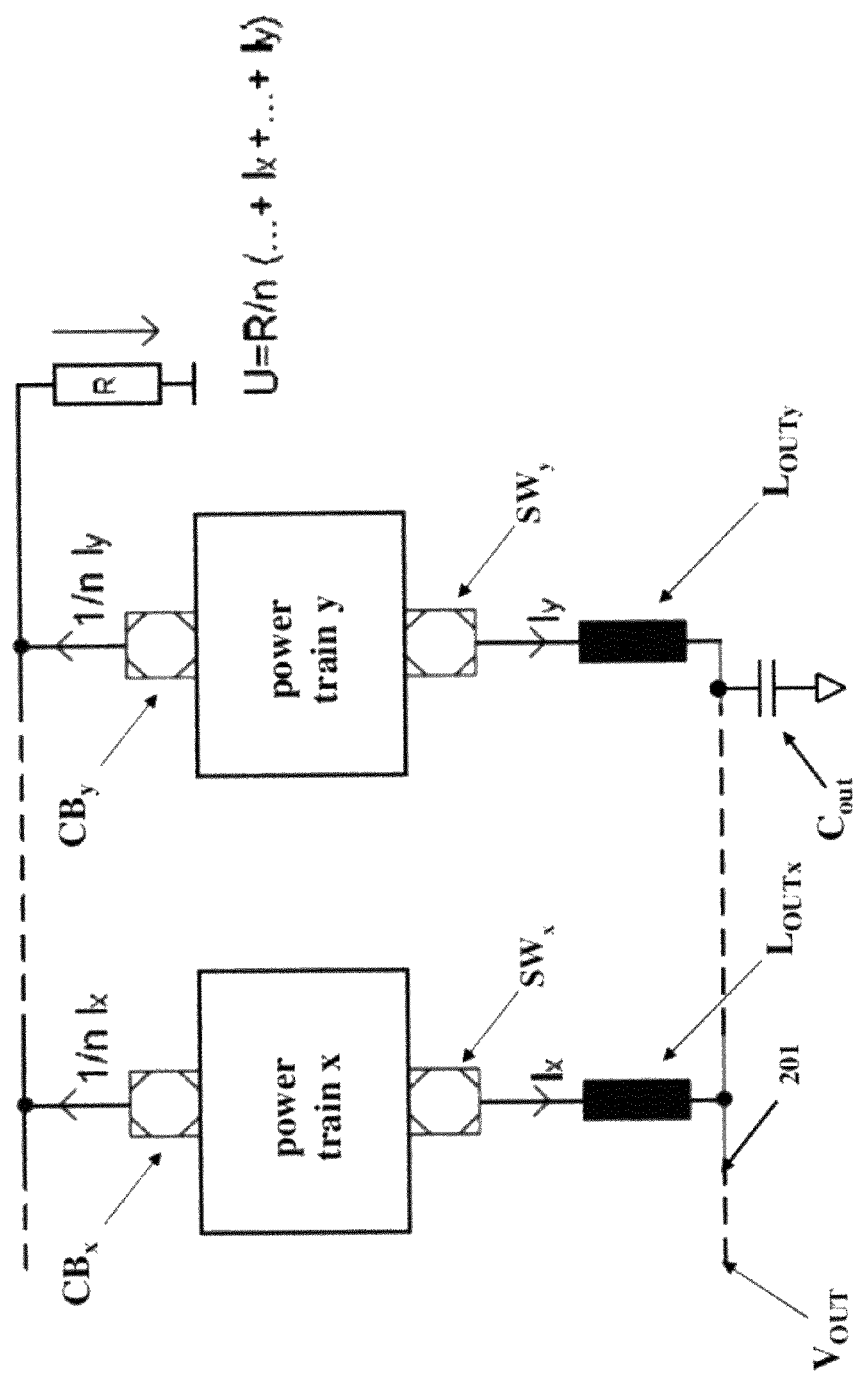
FIG. 2 illustrates a simplified schematic diagram showing portions of two power trains coupled in parallel through inductors to a common output power bus.

Turning now to FIG. 2, illustrated is a simplified schematic diagram showing portions of two power trains, illustrated as power train x and power train y, coupled in parallel by pins $SW_x$ and $SW_y$ through inductors $L_{OUTx}$ and $L_{OUTy}$ to a common output bus 201. The common bus 201 supplies a power converter output voltage $V_{OUT}$ filtered by the output capacitor $C_{out}$. When analog control loops are employed with analog devices, an output signal from each power train, such as output signals at pins $CB_x$ and $CB_y$, can produce a current signal corresponding to an image of its individual power train load current times 1/n, e.g., load currents $I_x$ and $I_y$ times 1/n, where n is the number of power trains actively operating in parallel. By connecting all output signals $CB_x$ and $CB_y$ of a multiphase converter together at a common node via a common resistor with resistance R to ground, the voltage $U=(R/n)\cdot(\ldots I_x+I_y\ldots)$ produced across the resistor R provides a measure of the total load current provided by the individual power trains.

As described previously hereinabove, each power train has to "know" how many power trains are connected together to determine if its actual individual load current is low or high compared to the individual load currents provided by the other power trains. The current-signaling arrangement is dependent on an independent source of information for the number of active power trains as well as the accuracy of the resistance R of the common resistor coupled to ground that is employed to signal the total load current.

Two design alternatives are considered. In a first alternative, an external resistor R is employed to communicate a total load current as illustrated in FIG. 2. The total load current is known by the data exchange mechanism, but not directly the share of each individual power train device, because the number of connected power train devices has to be known. In a second alternative, an internal resistance in each power train device is employed as an internal current-sensing resistor instead of one external resistance.

The current signaling arrangement illustrated in FIG. 2 is susceptible to adaptation of power train parameters interfering with load regulation such as control of the output bus voltage $V_{OUT}$ due to a change in current sharing or to a change in total load current. When the power trains update their parameters at different points in time, intermediate changes in power train current sharing can occur that can lead to an undesired control response such as a limit cycle, or instability in the worst case.

As introduced herein, a digital bus interface is employed to transfer power train data synchronously among paralleled power trains, especially for current sharing, and to synchronize power train responses to a change in an operating condition.

For power trains with a digital control loop, the actual load current is represented by a digital quantity. A digital exchange of the actual load current values produced by each power train, either among the power trains or by a transfer of these data to a master power controller, allows a precise determination of the overall load current presented to the power converter and its distribution among the individual power trains.

Figure 3:
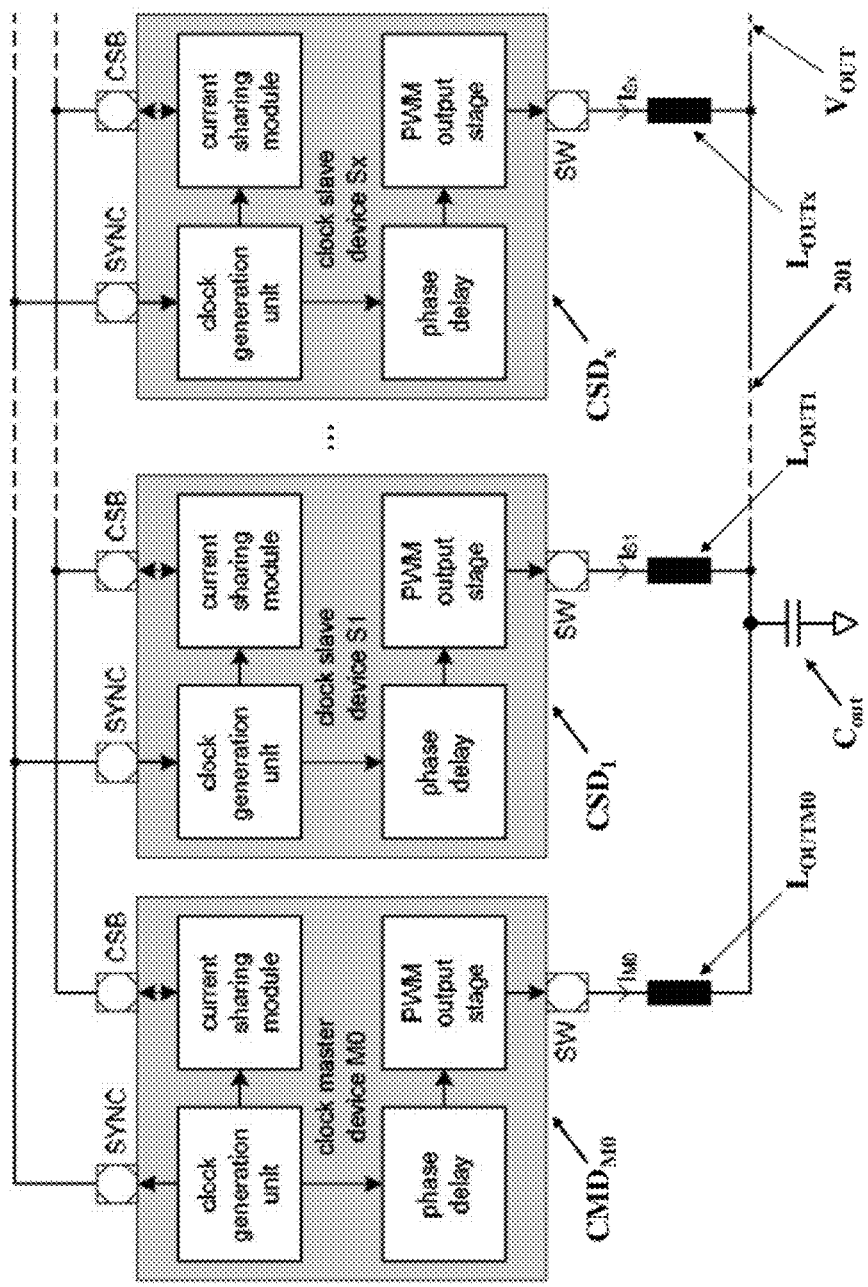
FIG. 3 illustrates a power converter formed with a plurality of power trains including a master power control device and slave power control devices, constructed according to an embodiment.

Turning now to FIG. 3, illustrated is a power converter formed with a plurality of power trains including master power control device $CMD_{M0}$ and slave power control devices $CSD_1, \ldots, CMD_x$, constructed according to an embodiment. The master and slave power control devices include power train components such as the components illustrated as the integrated circuit 150 in FIG. 1.

As illustrated in FIG. 3, each master power control device and slave power control device is formed with a clock generation unit. The clock generation unit in the master power control device generates a clock synchronization signal coupled to a clock signal pin SYNC. The clock generation units in the slave power control devices receive the clock synchronization signal on their respective clock signal pin SYNC. Each master power control device and slave power control device includes a current sharing module coupled to its respective clock generation unit that supplies a current sharing bus signal on its respective current sharing bus pin CSB. Each master power control device and slave power control device further includes a phase delay unit coupled to its respective clock generation unit that delays a respective gate drive signal for a power switch, such as the gate drive signal $S_D$ described hereinabove with reference to FIG. 1. The PWM ("pulse-width modulated") output stage included in each master and slave power control device is coupled to a respective phase delay unit to interleaved switched currents produced by each master or slave power control device, and includes at least one power switch such as the power switch $Q_{main}$, that was also described hereinabove with reference to FIG. 1.

Each master power control device $CMD_{M0}$ and slave power control device $CSD_i$, i=1, . . . x, is coupled respectively to an output inductor, $L_{OUTM0}$ and $L_{OUT1}, \ldots, L_{OUTx}$, that, in turn, are coupled together to a common output bus 201. The common output bus 201 supplies a power converter output voltage $V_{OUT}$ filtered by the output capacitor $C_{out}$.

Although a digital bus interface itself is known in the art, a shared data channel for current sharing and for related functions utilizing a synchronization signal that already exists for another purpose is introduced herein. The new digital bus interface offers advantages for current sharing among a plurality of power trains compared to other digital communication approaches. Other digital communication approaches may employ a master power controller using a star topology to handle digital communications for a complete system as well as for peer-to-peer connections. The structure introduced herein is a broadcast structure, wherein data may be autonomously handled by each power train employing an existing synchronization mechanism, particularly a combination of data transfers for multiphase power-train operation, so that a system master power controller is not needed. The system structure is thereby simplified. Providing simply a master power controller requires substantially less design and implementation effort than providing a master power system controller. A master power controller is employed if several power train devices are to be synchronized, e.g., for input current sharing.

Thus, to simplify the bus protocol for the CSB bus and timing between the power control devices connected to the CSB bus, a clock signal on the clock signal pin SYNC that already exists for synchronization of the multiphase operation of the plurality of power trains is employed to define timing of the CSB bus.

A minimal number of pins is needed if the current sharing information is transferred serially bit-by-bit. As illustrated in FIG. 3, only one CSB pin is needed for this example. If a higher number of pins is available, a current sharing bus can also be formed as a parallel bus.

In a first embodiment, current-sharing data is digitally transferred to a unit that calculates the sum of all power-train currents. For this unit, there are two main implementation possibilities:

In the first embodiment, one unit (e.g., a unit in a system master power controller) collects current-sharing data from individual devices, and the result of the calculation of the sum of all power-train currents is then distributed to the slave devices, for example, via a PMBus. The wiring for this data transfer can be implemented in the form of a peer-to-peer star connection or via shared pins or lines, as in a PMBus arrangement. The first embodiment can advantageously reduce the complexity of the current-sharing calculation in the slave devices, but it increases the overall communication effort.

In a second embodiment, a power train obtains data related to current sharing that is broadcast by other individual power trains. Then, each power train independently performs its own current-sharing calculation employing the broadcast data. The hardware and effort to do the calculation in each power train is quite low. For example, only a small state machine is required, including an adder and a shift register for later division by the number of phases. This makes the second embodiment preferable to the first in many applications. Furthermore, if each power train performs the current-sharing calculation on its own, the data transfer from a system master power control unit to a slave power control unit is no longer necessary, because the essential information that is required to do the current-sharing calculation is available in each device.

In the second implementation, only one additional pin (the pin CSB, as illustrated in FIG. 3) is advantageously needed for each device if the load current information is serially transferred by a time-slot based mechanism. In this manner, the power trains transmit load current data one after the other via the CSB bus. The common SYNC bus is employed by the individual power trains to define transmission timing.

Figure 4:
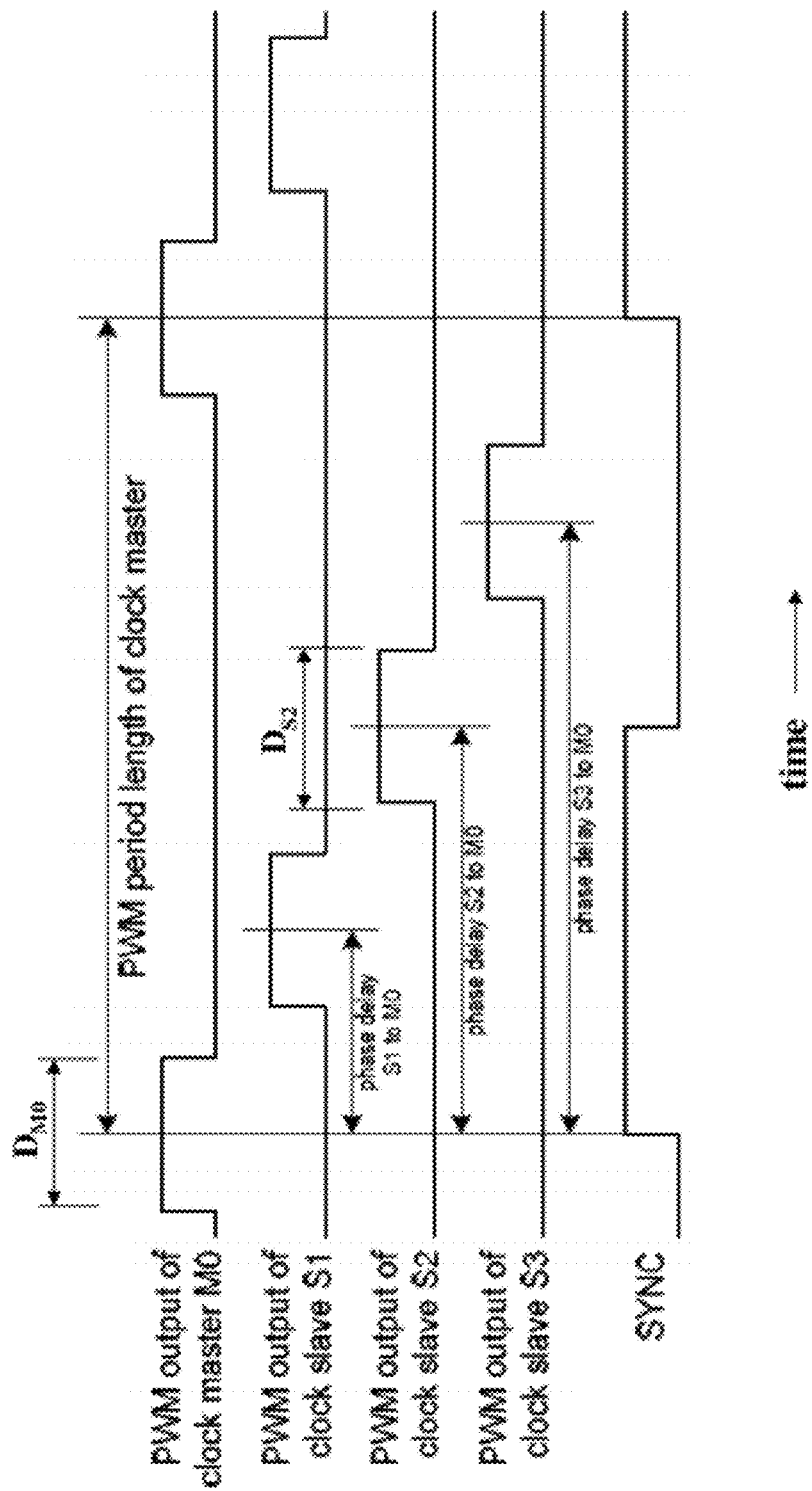
FIG. 4 illustrates a simplified timing diagram of a multiphase dc-dc converter including four power-train phases operating in parallel, constructed according to an embodiment.

Turning now to FIG. 4, illustrated is a simplified timing diagram for a multiphase dc-dc converter including four power-train phases operating in parallel, constructed according to an embodiment. To achieve performance targets such as low EMI, improved cooling, or reduced input current ripple as mentioned previously hereinabove, the power train phases operate with a phase shift between the switching actions of the different power trains. Each power train has an identified phase delay in the multiphase converter. In the given example, a respective phase delay is shown between a master power control device and the slave power control devices, and the phases of the various power trains are synchronized to the rising edge of the SYNC signal provided by the clock generation unit in the master power control device.

Control of phase delay alone does not guarantee symmetric or uniform power delivery over all power trains under a range of operating conditions. Due to variations in production processes for the individual power trains and for the complete system, asymmetries between the power trains will generally occur, as well as asymmetries due to variations of a local operating temperature. These asymmetries can be avoided if the power trains accommodate adjustment of a power-train parameter, such as a desired output voltage or an internal impedance of a power train. To dynamically share current and provide for its uniform distribution among a plurality of power trains, it is important to obtain operational data about the actual load presented to the power converter, and to include a mechanism to adapt power-train parameters accordingly.

Therefore, the total output current of the power converter has to be collectively known by the individual power trains, as well as the current provided by each power train, so that each power train can be independently controlled to provide a current related to the currents provided by the others. Dynamic control of power-train parameters provides accommodation of power train parameter variations due to different local operating temperatures or load profiles results in different impedances "seen" by the power trains when feeding a current into a common output power bus. Particularly after a change in a load characteristic such as the load current, the current distribution among the power trains may change.

A time-slot based mechanism is employed to control a characteristic of each power train such as the current the power train delivers to an output power bus. A clock SYNC signal is supplied by a clock generation unit in a master power control device to synchronize PWM signals and data bits transmitted by each master or slave power control device. Each PWM output of a master or slave power control device controls a duty cycle of a respective main power switch. For the illustrated duty cycles $D_{M0}$ and $D_{S2}$ for a main power switch in the master power control device $CMD_{M0}$ ("M0") and the slave device CSD "S2", the duty cycle is delayed by a respective phase delay with respect to the SYNC signal. The respective phase delays may be defined by a PMBus or other data transfer arrangement such as by a signal in a further node. For example, one or more pins associated with a power train may be grounded or coupled to a voltage source to identify a phase delay for a particular power train.

Figure 5:
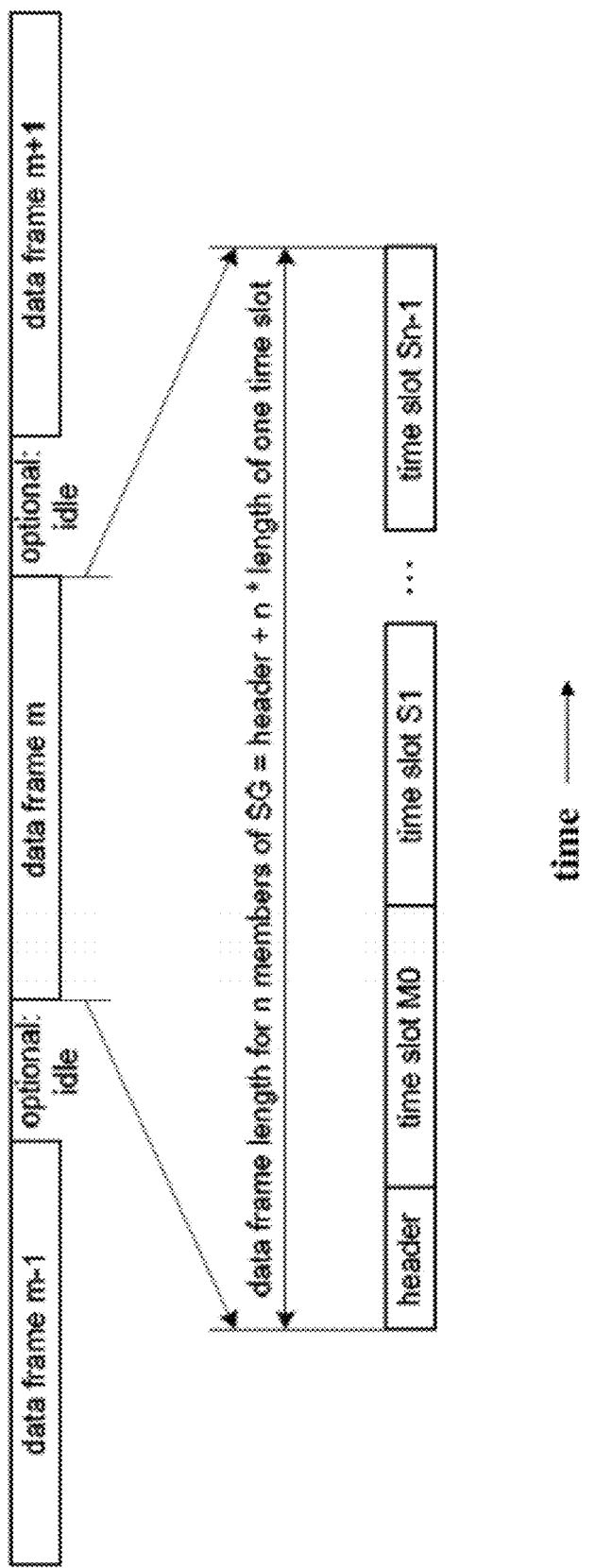
FIG. 5 illustrates a time-slot structure for broadcast of data by a master and slave power control devices to enable control of a characteristic of individual power trains, constructed according to an embodiment.

Turning now to FIG. 5, illustrated is a time-slot structure for broadcast of data by the master and slave power control devices to enable control of a characteristic of the individual power trains, such as a current, constructed according to an embodiment. The consecutive time slots for the devices and the header form a data frame. A header is an example of an indicator for the start of a frame. The time slot structure is illustrated in the top portion of FIG. 5 as a sequence of data frames separated by an optional idle period. The optional idle time can be employed to achieve a special timing or data transfer independent of the number of devices. The timing can be used to trigger responses in the power trains, such as calculation of the overall load current, i.e., the sum of the load currents of all devices, and the adaptation of device parameters. In this manner, all devices can perform the appropriate calculations and current-sharing responses synchronously, and no distribution of intermediate or further control information is necessary. Below the sequence of data frames, the time-slot structure of a data frame is illustrated, including a header field that may be transmitted by the master power control device. Each time slot, such as time slot illustrated as "time slot M0" in FIG. 5, comprises a number of bits, such as 16 bits. This time-slot broadcast structure enables each power train to determine at the same time how many power trains are active. The structure enables each power train to determine if its output current should be increased or decreased with respect to the others, or to determine if an output resistance should be changed to alter a current-sharing characteristic.

If a header field is transmitted by the master power control device before the current-sharing data is transmitted, additional information can be transferred. The header itself can be employed to synchronize actions of the power trains. For example, it can be employed to indicate the start of a new transfer sequence of current sharing information. In this manner, timing information inside each power train need only refer to one data frame without the need for longer-counting counters, because the required responses refers to a time window referenced to the header. It is advantageous to transmit a value in the header that cannot be used as a data value of the power trains in the time slots reserved for data transfer. In this manner, the power trains can easily be synchronized to each other with the proper phase delay employing data contained in the header. This property is important after start-up of the system, or in case of a disturbance, particularly if a power train has a lost or a changed actual position in a data frame.

The data transfer structure that is set up with a CSB and the synchronization to SYNC allows also the transfer of other types of data without additional overhead. The same header structure accordingly can be used. For example, with one header, the power trains send the current sharing information, whereas with another header, they send an operating temperature value. In this manner, another approach to current sharing can be utilized, for example, to obtain equal power train temperatures. This illustrates an example of the flexibility offered by a digital control interface as introduced herein. The generation of the header is quite simple, wherein a known data packet is sent in a fixed time frame. In this manner, the data-processing overhead in the power trains advantageously can be low.

Figure 6:
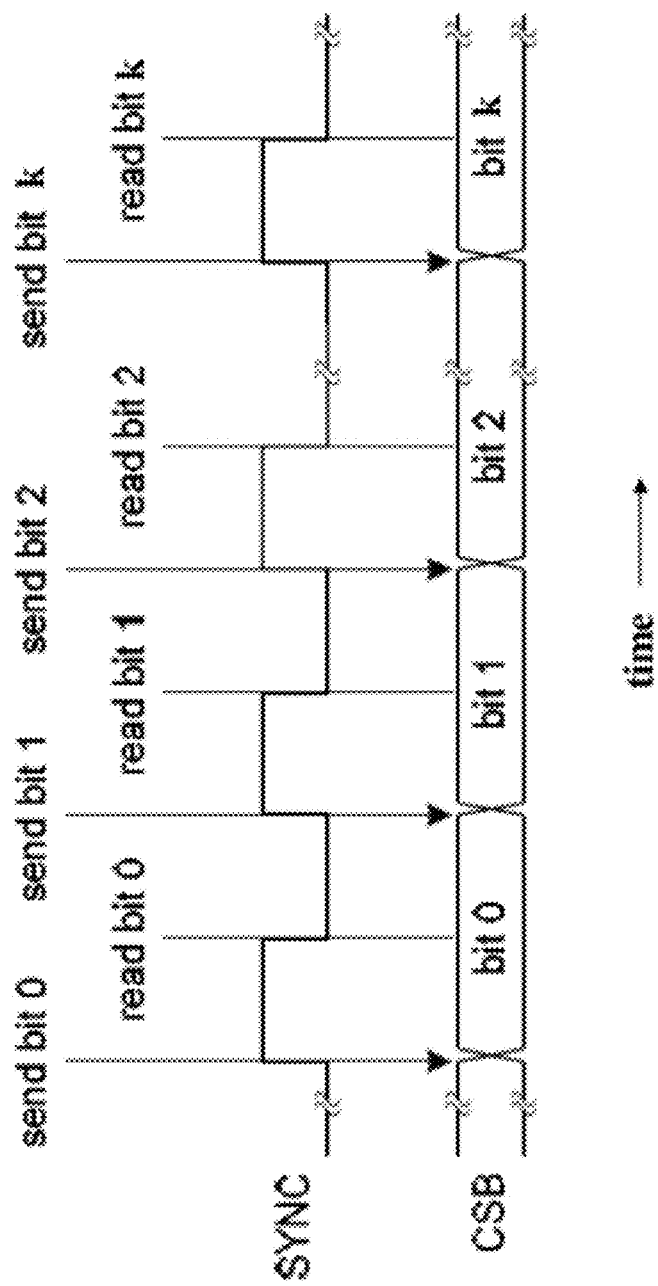
FIG. 6 illustrates a timing diagram showing synchronous serial data transfer of one current sharing bus data bit per synchronization timing signal cycle, constructed according to an embodiment.

Turning now to FIG. 6, illustrated is a timing diagram showing synchronous serial data transfer of one CSB data bit per SYNC timing signal cycle, constructed according to an embodiment. The SYNC timing signal is illustrated in FIG. 6 with a 50% duty cycle. The k data bits, such as 16 data bits, form one time slot. It is also possible to extend the data bits to N cycles of the SYNC signal, especially for high SYNC frequencies.

The transfer of current sharing data among the master and slave power control devices takes place in consecutive time slots in a data frame. The length of the time slots is defined by a plurality of periods of the SYNC signal, wherein the length of the time slots depends on the physical implementation of the various buses and the amount of data bits to be transferred in a particular application. These values, which are characteristics of the power trains, are known in the system.

At the rising edges of the SYNC signal, a master or slave power control device transmits a data bit, such as bit 0, . . . , bit k. At the falling range of the SYNC signal, the master and slave power control devices each read the data. In this manner, all the power control devices have concurrent access to all the data, and enabling each to concurrently calculate total load current as well as the load current supplied by each power train. Accordingly, each power train can respond with a coordinated and temporally aligned change in an output characteristic.

The timing structure is not difficult to design and implement. Information will be known about the respective timing of each power train in multiphase operation (e.g., its assigned phase delay), identification of the active power trains, and association of each active power train to its time slot is made.

The concept has thus been introduced of employing a power control device to provide current-sharing control in a power converter including a plurality of power trains. In an embodiment, the power control device provides or receives a synchronization signal on a synchronization node. The synchronization signal is employed by the power control device to initiate a time frame including a plurality of time slots and to control a switching activity that may include a phase delay of a power switch in a power train. The power control device further includes a current sharing bus node. The power control device transmits a digital signal in a designated time slot in the plurality of time slots on the current sharing bus node. In an embodiment, the digital signal is a current-sharing signal. In a further embodiment, the digital signal is a local temperature signal. In an embodiment, the power control device determines a value of a load current of the power converter employing current data received on the current-sharing bus node from another power control device, and wherein the power converter includes the power control device and the another power control device. In an embodiment, the power control device controls a current of the power control device dependent on the value of the load current. In an embodiment, the power control device is a master power control device that transmits the synchronization signal on the synchronization node. In an embodiment, the master power control device transmits the value of the load current in a further designated time slot. In an embodiment, the plurality of time slots includes a frame, wherein the frame includes a header, and wherein the power control device employs the header to synchronize an action in the power control device with a related action in another power control device. A header may include an indicator of a start of a frame. In an embodiment, the action includes determination of the value of the load current. In an embodiment, the header is employed to signal transmission of a different digital signal such as a local temperature signal in the designated time slot.

In an embodiment, the power control device is coupled to a further node. The further node is configured to provide a signal to the power control device to identify the designated time slot in the plurality of time slots and to control the switching activity of the power switch such as its phase delay. For example, the further node may be grounded with a shorting strap to provide the identifying signal.

Another exemplary embodiment provides a power control device including a synchronization node configured to carry a synchronization signal. In an embodiment, the synchronization signal is employed by the power control device to initiate a time frame including a plurality of time slots and to control a switching activity of a power switch. In an embodiment, the power control device is a master power control device that transmits the synchronization signal on the synchronization node. In an embodiment, the power control device is coupled to a second node, wherein the power control device transmits a digital signal on the second node in a designated time slot in the plurality of time slots. In an embodiment, the power control device is coupled to a further node, wherein the further node is configured to provide a signal to the power control device to identify the designated time slot in the plurality of time slots and to control the switching activity of the power switch.

Another exemplary embodiment provides a method of controlling a power train. In an embodiment, the method includes employing a synchronization signal on a synchronization node to initiate a time frame including a plurality of time slots, and employing the synchronization signal to control a switching activity of a power switch in the power train such as its phase delay. The method includes transmitting a digital signal in a designated time slot in the plurality of time slots on a current sharing bus node. In an embodiment, the digital signal is a current sharing signal. In a further embodiment, the digital signal is a local temperature signal. In an embodiment, the method further includes determining a value of a load current of a power converter including the power train employing current data received on the current sharing bus node. In an embodiment, the method further includes controlling a current of the power train dependent on the value of the load current. In an embodiment, the method further includes transmitting the synchronization signal on the synchronization node. In an embodiment, the method further includes transmitting the value of the load current in a further designated time slot. In an embodiment, the plurality of time slots includes a frame, wherein the frame includes an indicator of a start of the frame, and wherein the indicator of the start of the frame is employed to synchronize an action in the power train with a related action in another power train. In an embodiment, the action includes determination of the value of the load current. In an embodiment, the method includes employing the indicator of the start of the frame to signal transmission of a different digital signal in the designated time slot.

A frame header may include the indicator of the start of the frame. The action can take place at the end of a frame (if the end is known), or at the beginning of the next frame. In either case, the action can be synchronized to any point of the frame, particularly because all power trains are synchronized.

In an embodiment, the method includes configuring a further node to provide a signal to identify the designated time slot in the plurality of time slots and to control the phase delay of the power switch.

Although processes to control current sharing among a plurality of power trains supplying a common load bus and related methods have been described for application to a power converter, it should be understood that other applications of these processes, such as for a power amplifier or a motor controller, are contemplated within the broad scope of the invention, and need not be limited to power converter applications employing processes introduced herein.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A power control device, comprising:
a synchronization node configured to carry a synchronization signal, wherein the synchronization signal is employed by the power control device to initiate a time frame comprising a plurality of time slots and to control a switching activity of a power switch of a DC to DC converter; and
a current sharing bus node, wherein the power control device transmits a digital signal in a designated time slot in the plurality of time slots on the current sharing bus node, wherein
the power control device determines a value of a load current of a power converter employing current data received on the current sharing bus node from a further power control device, and wherein the power converter comprises the power control device and the further power control device, and
the plurality of time slots comprises a frame, wherein the frame comprises an indicator of a start of the frame, and wherein the power control device employs the indicator of the start of the frame to synchronize a determination of the value of the load current of the power control device with a related determination of a value of a load current of the further power control device.

2. The power control device as claimed in claim 1, wherein the digital signal is a current sharing signal.

3. The power control device as claimed in claim 1, wherein the power control device controls a current of the power control device dependent on the value of the load current.

4. The power control device as claimed in claim 3, wherein the power control device is a master power control device that transmits the synchronization signal on the synchronization node.

5. The power control device as claimed in claim 4, wherein the master power control device transmits the value of the load current in a further designated time slot.

6. The power control device as claimed in claim 1, wherein the indicator of the start of the frame is employed to signal transmission of a different digital signal in the designated time slot.

7. The power control device as claimed in claim 1, coupled to a further node, wherein the further node is configured to provide a signal to the power control device to identify the designated time slot in the plurality of time slots and to control the switching activity of the power switch.

8. A method of controlling a power train, the method comprising:
employing a synchronization signal on a synchronization node to initiate a time frame comprising a plurality of time slots;
employing the synchronization signal to control a switching activity of a power switch of a DC to DC converter in the power train;
transmitting on a current sharing bus node a digital signal in a designated time slot in the plurality of time slots; and
determining a value of a load current of a power converter comprising the power train employing current data received on the current sharing bus node, wherein the plurality of time slots comprises a frame, wherein the frame comprises an indicator of a start of the frame, and wherein the indicator of the start of the frame is employed to synchronize determination of the value of the load current in the power train with a related determination of a value of a load current in another power train.

9. The method as claimed in claim 8, wherein the digital signal comprises a current sharing signal.

10. The method as claimed in claim 8, wherein the digital signal comprises a local temperature signal.

11. The method as claimed in claim 8, further comprising controlling a current of the power train dependent on the value of the load current.

12. The method as claimed in claim 11, further comprising transmitting the synchronization signal on the synchronization node.

13. The method as claimed in claim 11, further comprising transmitting the value of the load current in a further designated time slot.

14. The method as claimed in claim 8, wherein the action comprises determination of the value of the load current.

15. The method as claimed in claim 8, wherein the indicator of the start of the frame is employed to signal transmission of a different digital signal in the designated time slot.

16. The method as claimed in claim 8, wherein a further node is configured to provide a signal to identify the designated time slot in the plurality of time slots and to control the switching activity of the power switch.

17. A DC to DC converter for a parallel power chain, the DC to DC converter comprising:
a clock generation unit;
a current sharing module coupled to the clock generation unit, the current sharing module configured to
transmit current sharing information on a digital bus to other converters coupled to a power output of the DC to DC converter, and
receive current sharing information from the other converters from the digital bus;
a phase delay unit coupled to the clock generation unit, the phase delay unit configured to produce a phase delay that is out of phase with pulse width modulation (PWM) output stages of the other converters, wherein the phase delay is based on a synchronization signal of the DC to DC converter; and
a pulse width modulation (PWM) output stage coupled to the phase delay unit, the PWM output stage configured to be coupled to the power output of the DC to DC converter.

18. The DC to DC converter of claim 17, wherein the current sharing module performs a current sharing calculation based on the received current sharing information.

19. The DC to DC converter of claim 17, wherein the digital bus is a single pin bus.

* * * * *